US012353014B2

(12) United States Patent
Komljenovic et al.

(10) Patent No.: US 12,353,014 B2
(45) Date of Patent: Jul. 8, 2025

(54) MODE CONTROL IN HETEROGENEOUSLY INTEGRATED PHOTONICS

(71) Applicants: Tin Komljenovic, Goleta, CA (US); Minh Tran, Goleta, CA (US); Zeyu Zhang, Goleta, CA (US); Chong Zhang, Santa Barbara, CA (US)

(72) Inventors: Tin Komljenovic, Goleta, CA (US); Minh Tran, Goleta, CA (US); Zeyu Zhang, Goleta, CA (US); Chong Zhang, Santa Barbara, CA (US)

(73) Assignee: NEXUS PHOTONICS, INC, Goleta, CA (US)

( * ) Notice: Subject to any disclaimer, the term of this patent is extended or adjusted under 35 U.S.C. 154(b) by 264 days.

(21) Appl. No.: 18/337,008

(22) Filed: Jun. 18, 2023

(65) Prior Publication Data
US 2024/0418937 A1  Dec. 19, 2024

(51) Int. Cl.
   *G02B 6/27* (2006.01)
(52) U.S. Cl.
   CPC ......... *G02B 6/2793* (2013.01); *G02B 6/2766* (2013.01)
(58) Field of Classification Search
   None
   See application file for complete search history.

(56) References Cited

U.S. PATENT DOCUMENTS

| 6,083,843 | A  | * | 7/2000 | Ohja ......................... G02B 6/30 |
| | | | | 438/723 |
| 7,444,055 | B2 | * | 10/2008 | Tolstikhin .............. G02B 6/125 |
| | | | | 398/79 |
| 8,368,995 | B2 | * | 2/2013 | Dallesasse ............. H01S 5/021 |
| | | | | 359/279 |
| 9,134,478 | B2 | * | 9/2015 | Park ....................... H01S 5/2031 |
| 9,360,644 | B2 | * | 6/2016 | Fasano ............... G02B 6/12004 |
| 9,568,676 | B2 | * | 2/2017 | Collins ................ G02B 6/4257 |
| 10,459,166 | B2 | * | 10/2019 | Collins .............. G02B 6/12002 |
| 10,585,351 | B1 | * | 3/2020 | Valentine ................. G02B 6/30 |
| 10,641,959 | B1 | * | 5/2020 | Park ..................... G02B 6/1228 |
| 10,718,898 | B1 | * | 7/2020 | Park ..................... G02B 6/1228 |
| 10,859,764 | B2 | * | 12/2020 | Park ..................... G02B 6/1228 |
| 10,877,229 | B2 | * | 12/2020 | Tummidi ................. G02B 6/42 |
| 11,029,466 | B2 | * | 6/2021 | Charles ................. H01S 5/4031 |
| 11,209,592 | B2 | * | 12/2021 | Zhang ................ G02B 6/12004 |
| 11,287,573 | B1 | * | 3/2022 | Zhang .................. G02B 6/1228 |

(Continued)

*Primary Examiner* — Andrew Jordan
(74) *Attorney, Agent, or Firm* — Shalini Venkatesh

(57) ABSTRACT

A device has first, second and third elements fabricated on a common substrate. The first element supports a first optical mode in an active waveguide structure characterized by a mesa. The second element supports a second optical mode in a passive waveguide structure. The third element, at least partly butt-coupled to the first element, supports an intermediate optical mode in an intermediate waveguide structure characterized by a waveguide core cross section including a shallow step. A tapered waveguide structure in at least one of the second and third elements facilitates efficient adiabatic transformation between the second optical mode and the intermediate optical mode. No adiabatic transformation occurs between the intermediate optical mode and the first optical mode. Lithographic alignment marks facilitate precise alignment of the three elements during device fabrication.

17 Claims, 12 Drawing Sheets

(56) References Cited

U.S. PATENT DOCUMENTS

| | | | |
|---|---|---|---|
| 11,480,734 B2* | 10/2022 | Park | G02B 6/1228 |
| 11,662,523 B2* | 5/2023 | Bian | G02B 6/305 |
| | | | 385/49 |
| 11,719,883 B1* | 8/2023 | Zhang | G02B 6/1228 |
| | | | 385/14 |
| 11,808,997 B1* | 11/2023 | Tran | G02B 6/4215 |
| 11,906,773 B2* | 2/2024 | Park | G02B 6/0023 |
| 11,971,577 B2* | 4/2024 | Tran | H01S 5/1014 |
| 2008/0138008 A1* | 6/2008 | Tolstikhin | G02B 6/125 |
| | | | 385/14 |
| 2014/0294341 A1* | 10/2014 | Hatori | G02B 6/1228 |
| | | | 385/14 |
| 2016/0047983 A1* | 2/2016 | Collins | G02B 6/13 |
| | | | 438/27 |
| 2018/0100970 A1* | 4/2018 | Park | G02B 6/1228 |
| 2020/0166703 A1* | 5/2020 | Charles | G02B 6/136 |
| 2020/0233149 A1* | 7/2020 | Park | G02B 6/13 |
| 2020/0264391 A1* | 8/2020 | Tummidi | G02B 6/424 |
| 2020/0284979 A1* | 9/2020 | Park | G02B 6/12004 |
| 2021/0063627 A1* | 3/2021 | Park | G02B 6/005 |
| 2021/0088727 A1* | 3/2021 | Park | H01S 5/1064 |
| 2021/0373235 A1* | 12/2021 | Zhang | G02B 6/1228 |
| 2022/0013985 A1* | 1/2022 | Koch | H01S 5/1014 |
| 2022/0120970 A1* | 4/2022 | Zhang | G02B 6/12004 |
| 2022/0190550 A1* | 6/2022 | Hjartarson | H01S 5/1032 |
| 2023/0266532 A1* | 8/2023 | Zhang | G02B 6/305 |
| | | | 385/14 |
| 2023/0352908 A1* | 11/2023 | Komljenovic | H01S 5/028 |
| 2023/0361534 A1* | 11/2023 | Zhang | G02B 6/14 |
| 2023/0400634 A1* | 12/2023 | Tran | H01S 5/1014 |
| 2023/0420916 A1* | 12/2023 | Zhang | H01S 5/04257 |
| 2024/0159960 A1* | 5/2024 | Komljenovic | H01S 5/02253 |
| 2024/0192441 A1* | 6/2024 | Komljenovic | G02B 6/136 |
| 2024/0291239 A1* | 8/2024 | Komljenovic | H01S 5/0215 |
| 2024/0332907 A1* | 10/2024 | Komljenovic | H01S 5/162 |
| 2024/0372332 A1* | 11/2024 | Zhang | H01S 5/222 |
| 2024/0418937 A1* | 12/2024 | Komljenovic | G02B 6/2793 |
| 2025/0035849 A1* | 1/2025 | Dorche | G02F 1/0102 |

\* cited by examiner

MODE CONTROL IN HETEROGENEOUSLY INTEGRATED PHOTONICS

FIELD OF THE INVENTION

The present invention relates to photonic integrated circuits. More specifically, certain embodiments of the invention relate to improved performance of heterogeneously integrated lasers and active components using dissimilar materials that are optically coupled.

BACKGROUND OF THE INVENTION

A photonic integrated circuit (PIC) or integrated optical circuit is a device that integrates multiple photonic functions and as such is analogous to an electronic integrated circuit. The major difference between the two is that a photonic integrated circuit provides functions for information signals imposed on optical carrier waves. The material platform most commercially utilized for photonic integrated circuits is indium phosphide (InP), which allows for the integration of various optically active and passive functions on the same chip. Although many current PICs are realized in InP platforms, there has been significant research in the past decade in using silicon rather than InP for the realization of PICs, due to some superior characteristics as well as superior processing capabilities for the former material, that leverage the investment already made for electronic integrated circuits.

The biggest drawback in using silicon for PICs is that it is an indirect bandgap material which makes it hard to provide electrically pumped sources. This problem is generally solved by assembling PICs comprising two or more chips made from dissimilar materials in separate processes. Such an approach is challenging due to a need for very fine alignment, which increases packaging costs and introduces scaling limitations. Another approach to solving the bandgap problem is to bond two dissimilar materials and process them together, removing the need for precise alignment during the bonding of larger pieces or complete wafers of the dissimilar materials, and allowing for mass fabrication. In this disclosure, we use the term "hybrid" to describe the first approach that includes precise assembly of separately processed parts, and we use the term "heterogeneous" to describe the latter approach of bonding two materials and then processing the bonded result to define the waveguides and other components of interest.

To transfer the optical signal between dissimilar materials, the heterogeneous approach utilizes tapers whose dimensions are gradually reduced until the effective mode refractive indexes of dissimilar materials match and there is efficient power transfer. This approach generally works well when materials have small difference in refractive indexes as is the case with silicon and InP. In cases where there is a larger difference in effective indexes, such as between e.g. SiN and GaAs or InP, the requirements on taper tip dimensions become prohibitive limiting efficient power transfer. Specifically, extremely small taper tip widths (of the order of tens of nanometers) may be necessary to provide good coupling. Achieving such dimensions is complex and may be cost prohibitive.

Although InP and silicon-based PICs address many current needs, they have some limitations; among them the fact that the operating wavelength range is limited by material absorption increasing the losses, and the fact that there is a limit on the maximum optical intensities and consequently optical powers that a PIC can handle. To address these limitations, alternate waveguide materials have been considered, such as SiN, SiON, $LiNbO_3$, $TiO_2$, $Ta_2O_5$, AlN or others. In general, such dielectric waveguides have higher bandgap energies which provides better high-power handling and transparency at shorter wavelength, but, in general such materials also have lower refractive indexes. E.g. SiN with bandgap of ~5 eV has refractive index of ~2, AlN has bandgap of ~6 eV and refractive index of around ~2, and $SiO_2$ with bandgap of ~8.9 eV has refractive index of ~1.44. For comparison, the refractive index of both InP and GaAs is >3. This makes the tapered approach challenging.

The alternative hybrid approach suffers from the drawbacks already mentioned above, namely the need for precise alignment, and correspondingly complex packaging and scaling limitations.

A recent approach to the problems discussed above was presented in U.S. Pat. No. 10,859,764 B2 employing butt-coupling in combination with a mode-converter to allow the heterogenous process to be used without the need for extremely small taper widths. The use of butt-coupling significantly relaxes the requirements on taper widths, but may have challenges related to mode control as some waveguide geometries that are optimized for butt-coupling efficiency with the active region (III/V material) might not be single-mode due to the refractive index contrast as will be described in more detail below. Any fabrication imperfection, either misalignment or some other imperfection, can excite higher order modes and this can result in increased coupling losses between the passive and active waveguide.

The present invention is directed towards PICs employing butt-coupling in this way but optimizes the mode control in the coupling region, improving the coupling efficiency and resulting in better performing active devices. In particular, embodiments described below are concerned with the detailed design of the optical coupling structure and waveguide design necessary for the creation of high-performance heterogeneously integrated lasers and other active devices.

DETAILED DESCRIPTION

Figure 1:
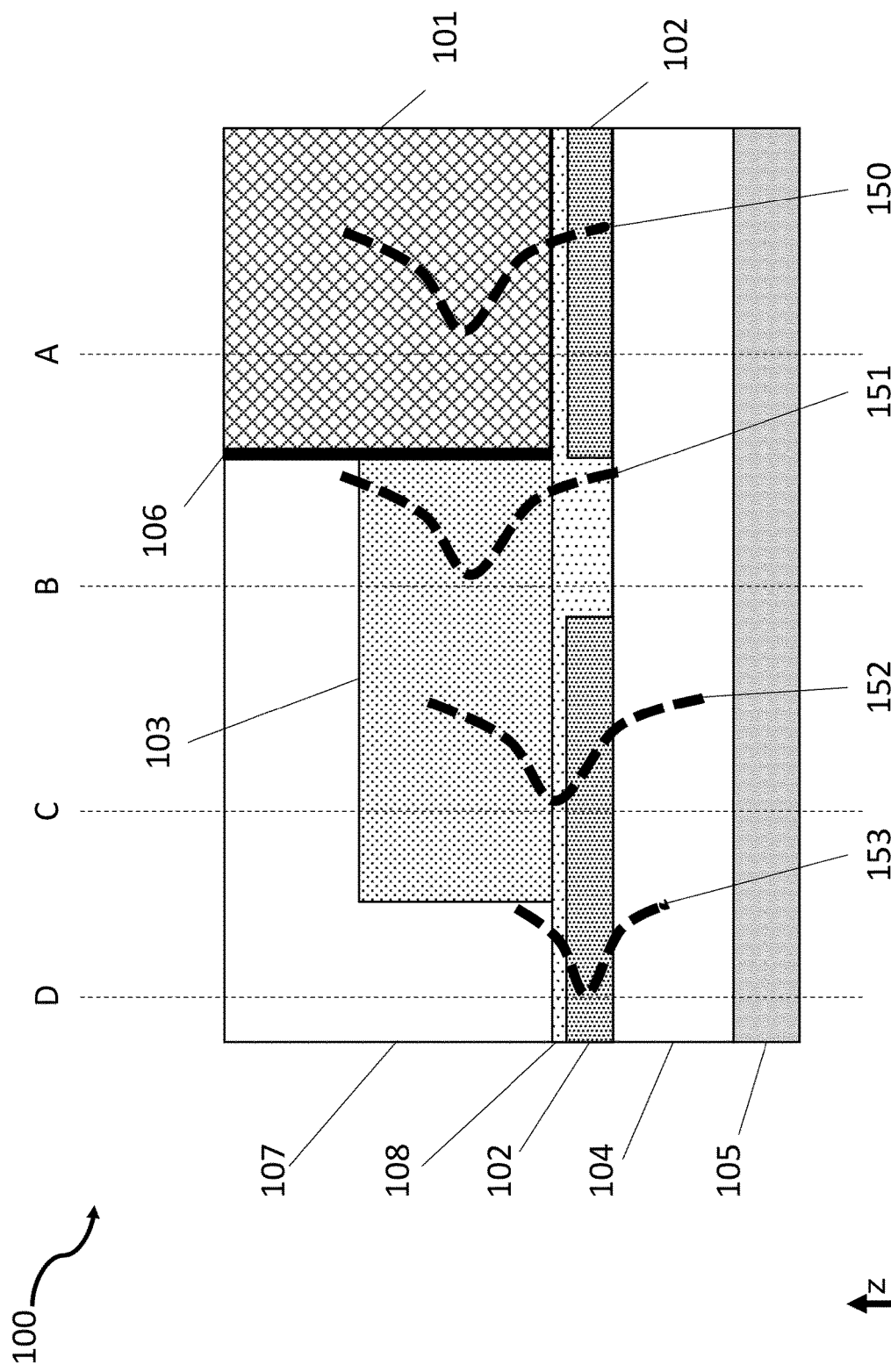
FIG. 1 illustrates a device according to one embodiment of the present invention, shown in cross section.

Described herein are embodiments of a platform for realization of photonic integrated circuits using wafer bonding and deposition of dissimilar materials where optical coupling is improved by the use of mode conversion and a butt-coupling scheme. More specifically, certain embodiments of the invention relate to improved performance of heterogeneously integrated lasers and active components using mode control optimization.

In the following detailed description, reference is made to the accompanying drawings which form a part hereof, wherein like numerals designate like parts throughout, and in which are shown by way of illustration embodiments in which the subject matter of the present disclosure may be practiced. It is to be understood that other embodiments may be utilized, and structural or logical changes may be made without departing from the scope of the present disclosure. Therefore, the following detailed description is not to be taken in a limiting sense, and the scope of embodiments is defined by the appended claims and their equivalents.

The description may use perspective-based descriptions such as top/bottom, in/out, over/under, and the like. Such descriptions are merely used to facilitate the discussion and are not intended to restrict the application of embodiments described herein to any particular orientation. The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The term "coupled with," along with its derivatives, may be used herein. "Coupled" may mean one or more of the following. "Coupled" may mean that two or more elements are in direct physical, electrical, or optical contact. However, "coupled" may also mean that two or more elements indirectly contact each other, but yet still cooperate or interact with each other, and may mean that one or more other elements are coupled or connected between the elements that are said to be coupled with each other. The term "directly coupled" means that two or more elements are in direct contact in at least part of their surfaces. The term "butt-coupled" is used herein in its normal sense of meaning an "end-on" or axial coupling, where there is minimal or zero axial offset between the elements in question. The axial offset may be, for example, slightly greater than zero in cases where a thin intervening layer of some sort is formed between the elements, such as thin coating layer typically used to provide high-reflectivity or anti-reflectivity functionality. It should be noted that the axes of two waveguide structures or elements need not be colinear for them to be accurately described as being butt-coupled. In other words, the interface between the elements need not be perpendicular to either axis in the case of e.g. angled interface. No adiabatic transformation occurs between butt-coupled structures.

Term "active device," "active structure" or otherwise "active" element, part, component may be used herein. A device or a part of a device called active is capable of light generation, amplification, modulation and/or detection using electrical contacts. This is in contrast to what we mean by a "passive device" whose principal function is to confine and guide light, and/or provide splitting, combining, filtering and/or other functionalities that are commonly associated with passive devices. Some passive devices can provide functions overlapping with active device functionality, such as phase tuning implemented using thermal effects or similar that can provide modulation. No absolute distinction should be assumed between "active" and "passive" based purely on material composition or device structure. A silicon device, for example, may be considered active under certain conditions of modulation, or detection of low wavelength radiation, but passive in most other situations.

FIG. 1 is a schematic cross-section view of an integrated photonic device 100 utilizing butt-coupling for efficient coupling between dissimilar materials. The illustrative cross-section includes a substrate 105 that can be any suitable substrate for semiconductor and dielectric processing, such as Si, InP, GaAs, quartz, sapphire, glass, GaN, silicon-on-insulator or other materials known in the art. In the shown embodiment, a layer of second material 104 is deposited, grown, transferred, bonded, or otherwise attached to the top surface of substrate 105 using techniques known in the field. The main purpose of layer 104 is to provide optical cladding for material 102 (to be described below), if necessary to form an optical waveguide. Optical waveguides are commonly realized by placing a higher refractive index core between two lower refractive index layers to confine the optical wave. In some embodiments, layer 104 is omitted and substrate 105 itself serves as a cladding.

Layer 102 is deposited, grown, transferred, bonded, or otherwise attached to the top of layer 104 if present, and/or to the top of substrate 105, using techniques known in the field. The refractive index of layer 102 is higher than the refractive index of layer 104 if present, or, if layer 104 is not present, the refractive index of layer 102 is higher than the refractive index of substrate 105. In one embodiment, the material of layer 102 may include, but is not limited to, one or more of SiN, SiON, $TiO_2$, $Ta_2O_5$, (doped) $SiO_2$, $LiNbO_3$ and AlN. In some embodiments, other common dielectric materials may be used for layer 102. In other embodiments, a high-bandgap semiconductor material may be used for layer 102. In some embodiments the refractive index of layer 102 is between 1.44 and 2.5. Either or both layers 104 and 102 can be patterned, etched, or redeposited to tailor their functionality (define waveguides, splitters, couplers, gratings, and other passive components) as is common in the art.

Layer 108, whose refractive index is lower than the refractive index of layer 102, overlays layer 102 and underlays layers 101 and 103. Layer 108 serves to planarize the patterned surface of layer 102. In some embodiments, the planarity of the top surface of layer 108 is provided by chemical mechanical polishing (CMP) or other etching, chemical and/or mechanical polishing methods. In other embodiments, the planarity is provided because of the intrinsic nature of the method by which layer 108 is deposited, for example if the material of layer 108 is a spin-on glass, polymer, photoresist, or other suitable material. The planarization may be controlled to leave a layer of desired, typically very low, thickness on top of the layer 102 (as shown in FIG. 1), or to remove all material above the level of the top surface of the layer 102 (not shown). In cases where layer 108 is left on top of layer 102, the target thicknesses are in the range of 10 nm to several hundreds of nm, with actual thickness, due to planarization process non-uniformities, being between zero and several hundreds of nanometers larger than the target thickness. In some embodiments, the process can go in multiple steps where e.g., layer 108 is removed on top of of layer 102, and then additional deposition of a layer 108 on the planarized surface is used to provide precise control of the layer 108 thickness. Such multistep processes can leverage selectivity of some materials and processes, e.g., material removal speed difference between two materials. In some embodiments, spin-on material is used to planarize and is then etched back resulting with improved across wafer uniformity compared to typical CMP processes.

Layer 101 is bonded on top of at least part of the corresponding (108, 102) top surface. The bonding can be direct molecular bonding, or additional materials can be used to facilitate bonding such as e.g. metal layers or polymer films as is known in the art. Layer 101 makes up what is commonly called an active device, and may be made up of materials including, but not limited to, InP and InP-based ternary and quaternary materials, GaAs and GaAs based ternary and quaternary materials, GaN and GaN based ternary and quaternary materials, GaP, InAs and InSb and their variations and derivatives or any other suitable material for providing direct optical emission, amplification, modulation and/or detection. Layer 101 in some embodiment is multilayered, comprising sublayers providing both optical and electrical confinement as well as electrical contacts, as is known in the art for active devices. Sublayers of layer 101 in some embodiments provide vertical confinement (up/down in FIG. 1, z-axis), while lateral confinement (surface normal to the cross-section shown in FIG. 1, y-axis which is not visible in this cross-section) is provided by at least one etch as is known in the art for active devices and will be described with the help of FIG. 2.

In some embodiments, layer 101 can be efficiently electrically pumped to generate optical emission and gain. In other embodiments, layer 101 can provide modulation and/or detection. The present invention enables efficient optical coupling between waveguides formed in layer 101 and layer 102. Said materials 102 can provide additional functionality such as wide-band transparency, low propagation loss, high intensity handling, phase shifting by temperature, strain or other tuning mechanisms, combining, splitting, filtering, non-linear generation and/or others as is known in the art.

Efficient coupling is facilitated by layer 103, and, in cases where layer 106 is present, by layer 106. Optional layer 106 primarily serves as either an anti-reflective or a highly reflective coating at the interface between layer 101 and layer 103. Layer 103 serves as an intermediate waveguide that in embodiments of the present invention accepts the profile (depicted in the FIG. 1 by line 150) of an optical mode supported by the waveguide for which layer 101 provides the core, captures it efficiently (as mode profile 151) and gradually transforms it as it passes through the intermediate waveguide (through mode profiles such as 152 and finally to 153) until it can be efficiently coupled to the waveguide for which layer 102 provides the core.

The refractive index and dimensions of layer 103 can be engineered to facilitate efficient butt-coupling to accept mode profile 150 and to efficiently transform the mode to one with mode profile 153 by taking advantage of tapered structures made in layer 102 and/or layer 103 as will be explained in more detail with the help of FIG. 9. In some embodiments, the refractive index of layers 103 is smaller than the refractive index of layer 102. In some embodiments the refractive index of layer 103 is between 1.44 and 2.2. The thickness of layer 103 is an optimization parameter, and in some embodiments, it is between 400 nm and 4000 nm, thickness largely being dependent on details of the layer 101 as will be described with the help of FIGS. 2 and 3.

Differences between the optical modes supported by waveguides in layers 101 and 102 respectively may or may not be obvious by observation of the mode profiles, but imperfect (less than e.g., 95%) mode overlaps and vertical offset (see FIG. 1) between modes 150 and 153 could (in the absence of intermediate layer 103) result in significant optical loss. In some cases, losses of up to 2 dB may be considered acceptable, but losses greater than that might not be. In other cases, a 5 dB loss level may be the criterion chosen for acceptability. The function of layer 103 is to keep optical coupling losses due to imperfect mode overlap and vertical offset (between modes 150 and 153) below whatever is determined to be an acceptable level in a given application.

The upper cladding layer 107 for waveguides realized in 103 and/or 102 can be ambient air (meaning no cladding material is actually deposited) or can be any deliberately deposited suitable material as shown in FIG. 1, including, but not limited to, a polymer, $SiO_2$, SiN, SiON etc. In some embodiments, the same material is used for layer 107 and layer 108. In some embodiments (not shown), layer 107 cladding functionality can be provided with multiple depositions, e.g., one material provides the cladding for mode 153 guided by the core formed in layer 102, another material provides the cladding for mode 151 guided by the core formed in layer 103. In all cases, the refractive index of the cladding material is lower than the refractive index of the material which provides the core for the mode guiding. In yet another embodiment (not shown here, but explained with the help of FIG. 8), layer 103 can provide, at least partial, cladding functionality to layer 102 and mode 153.

In some embodiments, layer 108 is not present and both layers 101 and 103 are positioned on top of a pattern layer 102, 101 by bonding/attachment, and 103 by deposition. In such embodiments, there is no planarization step. Such embodiments are described in more detail with the help of FIG. 10.

Dashed lines A, B, C and D correspond to cross-sectional end-on views of a device according to some embodiments of the present invention described in more detail with the help of FIGS. 2, 3, 6, 8 and 11.

Figure 2:
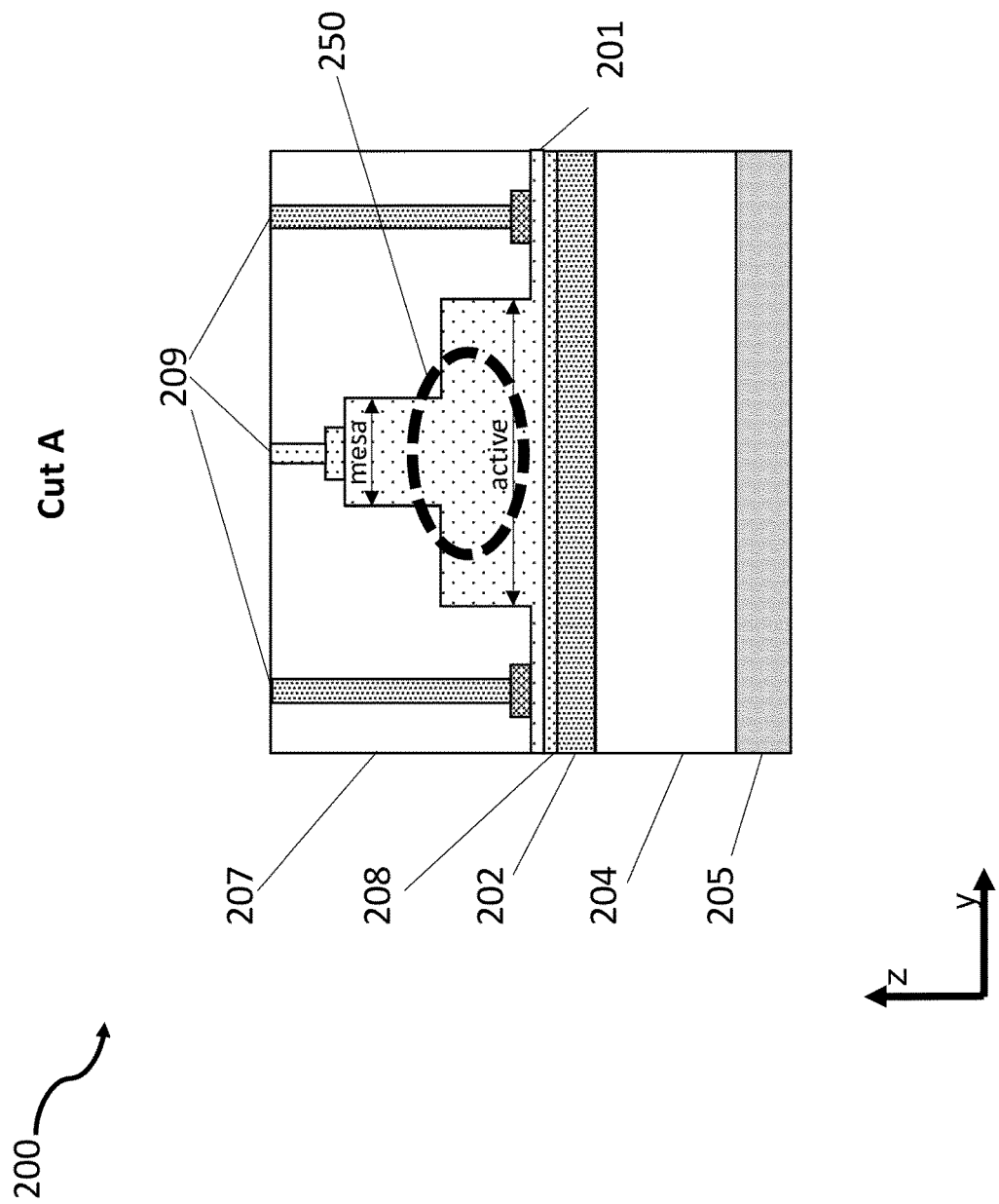
FIG. 2 shows cross-sectional end-on view of a device according to some embodiments of the present invention.

FIG. 2 and view 200 show a cross-sectional end-on view corresponding to the characteristic location marked A in FIG. 1. Functional layers 201 to 208 (unless explicitly defined differently) correspond to functional layers 101 to 108 as described in relation to FIG. 1. The cross-section 200 shows an illustrative cut through a region that comprises active layer 201 (corresponding to 101 in FIG. 1). Layer 201 comprises multiple sub-layers providing the functionality necessary to realize active devices. Such layers are realized with varying binary, ternary and quaternary compositions and various doping levels as is known in the art of designing III/V semiconductor optical devices to realize contact layers, active region (quantum wells, quantum dots, pn-junction, pin-junction), claddings, graded layers, separate-confinement heterostructure layers, bandgap smoothing layers, etch stop layers and/or others.

The optical mode 250 is laterally (y-axis) confined by at least one etch defining a mesa (as illustrated by labelled horizontal arrow in FIG. 2), while vertical confinement utilizes refractive index difference between the sublayers of layer 201 and, in some embodiments, claddings realized by at least one of the layers 202, 207 and 207.

In some embodiments, at least one etch defines the active region (as illustrated by the lower labelled horizontal arrow in FIG. 2). In some embodiments, the widths of the mesa and the active region are substantially equal (not shown). A general advantage of using two or more etches with different target widths for mesa and active regions (as sketched in view 200) is the ability to reduce the interaction of the etched sidewall with the optical mode 250 and/or move the etched active region sidewall (comprising quantum wells and/or quantum dots in some embodiments) away from where it would interact with both the optical mode and injected/depleted carriers (resulting in e.g. sidewall recombination).

The width of the mesa is an optimization parameter that depends on the wavelength of the operation, material composition of layer 101 and performance optimization. In general, a narrower mesa is preferred for single-mode control, while a wider mesa is preferred for good thermal performance and also for higher-power devices in general. In many cases, the peak power of the laser is limited by the intensity of the optical mode which can be reduced (at the same power) by increasing the mode size. In some embodiments mesa widths are between 1 μm and 5 μm. In some other embodiments mesa widths are >5 μm and can be as wide as 100 μm or more for very high-power designs. The width of the active region is either substantially equal to the mesa width (not shown) or more often >2 μm wider than the mesa width for a particular design. To a first approximation the width of the optical mode 150 is similar to the mesa width, so a mesa of ~2 μm width will have a mode of ~2 μm width (typically defined at 1/e intensity).

The height of the mode is defined by the sublayers of layer 101, and also the cladding layer or layers as described earlier. In some embodiments the height of the mode is >500 nm (as defined at 1/e intensity). Also, the center of the mode can be at some height from the top of the surface 208, and, in some embodiments, this height can be >300 nm. The mode size and location/distance from top of the surface 208 (or surface 202 if 208 is fully removed, not shown) is important, as this is the height that has to be matched with structure 303 as described with the help of FIG. 3, as it is butt-coupled to layer 101/201 as described with the help of FIG. 1. The mode dimensions and offset/height from top surface 208 (or surface 202 if 208 is fully removed) can vary depending on exact design, and wavelength of operation, but in general mode sizes in the order of 1 μm$^2$ or larger are preferred for higher power laser designs to reduce the optical intensities. Contacts and metal 209 serve to provide current and/or electrical control of the active device.

Figure 3:
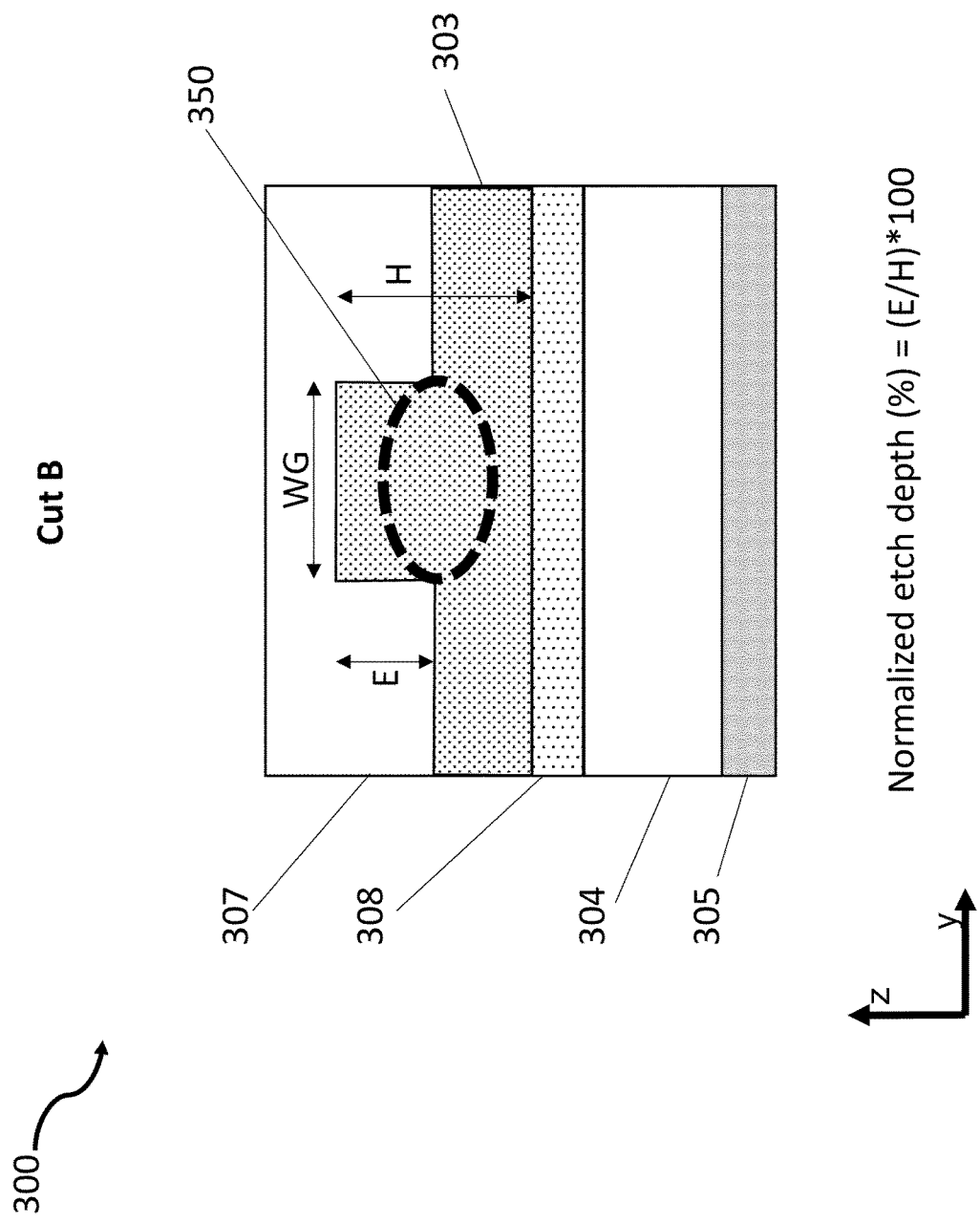
FIG. 3 shows cross-sectional end-on view of a device according to some embodiments of the present invention.

FIG. 3 and view 300 show a cross-sectional end-on view corresponding to the characteristic location marked B in FIG. 1. Functional layers 301 to 308 (unless explicitly defined differently) correspond to functional layers 101 to 108 as described in relation to FIG. 1. The cross-section 300 shows an illustrative cut through a region that comprises intermediate layer 303 (corresponding to 103 in FIG. 1). Layer 303 is typically deposited with target thickness H (as illustrated in view 300) and is optimized to facilitate efficient butt-coupling between mode 250 and mode 350. The coupling optimization includes thickness H, but also includes target waveguide width WG (as illustrated in view 300), and etch E (as illustrated in view 300). The normalized etch depth is defined as the ratio of etch depth E to thickness H. The normalized etch depth percentage, defined as E/H*100, can vary between 0% (no etch) and 100% (full etch). The effect of the normalized etch depth percentage on device performance will be described in more detail with the help of FIGS. 4 and 5. At a first approximation, the width WG is roughly the same as the width of the optical mode 150 as described above, and in some embodiments is >1 μm. The thickness H of layer 303 serves to center the optical mode 350 to optimize overlap with mode 250 and in some embodiments is >600 nm. Both parameters, as well as the etch depth E (described in more detail below) can be optimized using standard electromagnetic solvers. The refractive index of layer 303 is also an optimization parameter. In some embodiments, it is lower than the refractive index of layer 102/202/402 to facilitate more efficient coupling, as will be described with the help of FIGS. 6-7. In some embodiments, the refractive index of layer 303 is between 1.44 and 2.2. This refractive index range can be achieved using various materials including, but not limited to, polymers and dielectrics. Examples of dielectrics can be SiN, including non-stochiometric films, or SiON. Other suitable dielectrics can also be used. The cladding for the waveguide for which layer 303 provides the core is provided in part by at least some of the layers 304, 305, 307 and/or 308. In some embodiments, the cladding in layers 304, 307 and/or 308 is SiO$_2$. In yet other embodiments, it is SiON where refractive index is reduced by increasing the concentration of oxygen.

Figure 4:
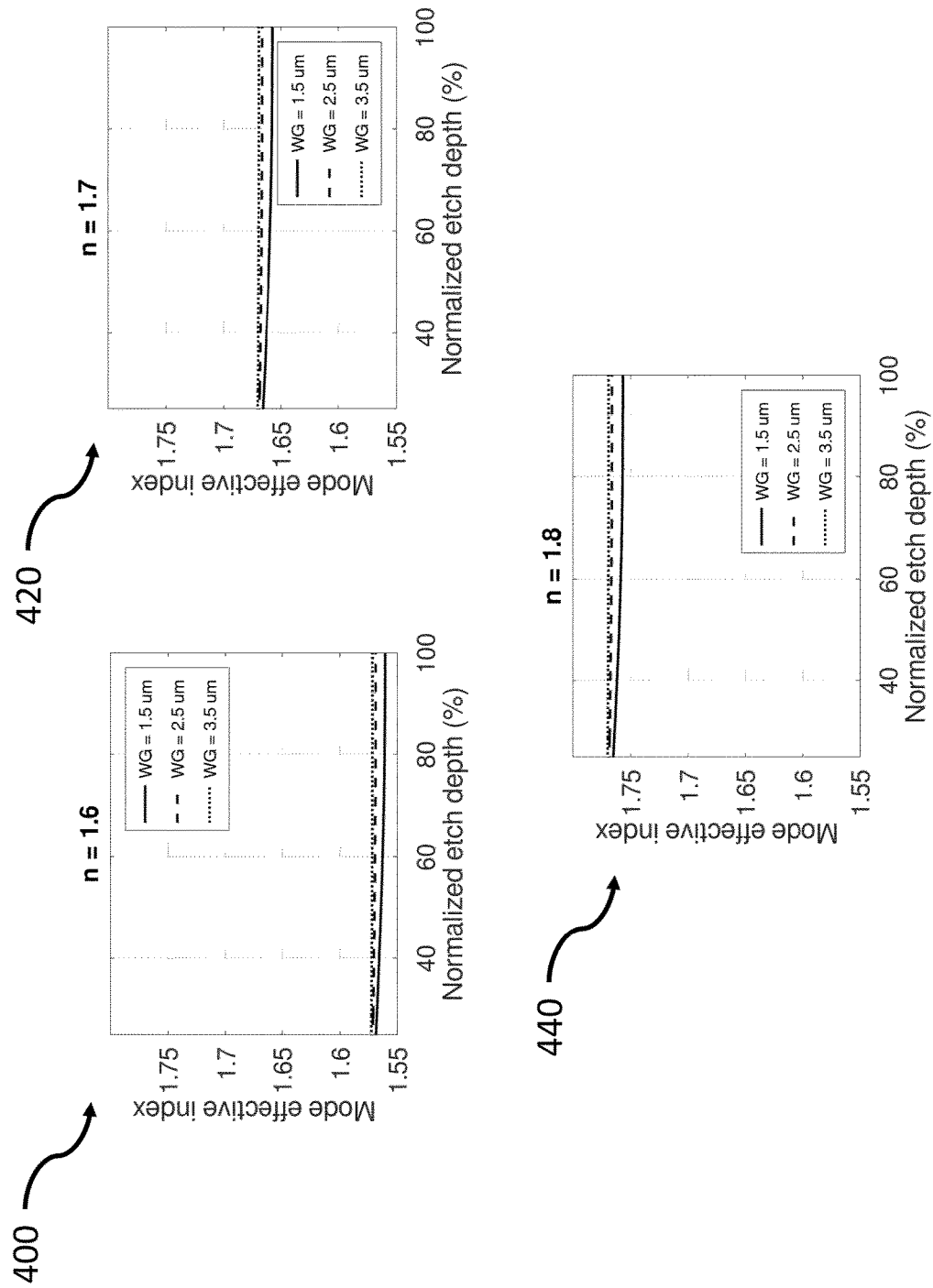
FIG. 4 shows illustrative simulation results for a device according to some embodiments of the present invention.

FIG. 4 shows some illustrative simulation results of the mode effective index in the waveguide formed in layer 303. For this illustrative case, we simulate the mode effective refractive index (sometimes referred to and labelled in FIG. 4 as effective index for simplicity) of the fundamental mode as a function of normalized etch depth for three values of width WG and three different refractive indexes of layer 303, where the cladding is SiO$_2$. The thickness H is 1 μm in all cases. Views 400, 420 and 440 show the results for the cases where layer 303 has a refractive index equal to 1.6, 1.7 and 1.8 respectively. The key takeaway from all three cases is that the mode effective refractive index has a relatively low dependence on the normalized etch depth, especially for waveguides with WG>1.5 μm. The reason for the very low dependence is the relatively large waveguide. Stability of the effective mode refractive index is important as it allows good performance (coupling efficiency between waveguides formed in layer 103 and 102) to be achieved, regardless of how tightly etch depth can be controlled, as will be explained with the help of FIGS. 6 and 7. The illustrative simulations shown are carried out at 780 nm wavelength, but similar curves can be simulated for any practical combination of the refractive indexes, geometries, and operating wavelengths.

Figure 5:
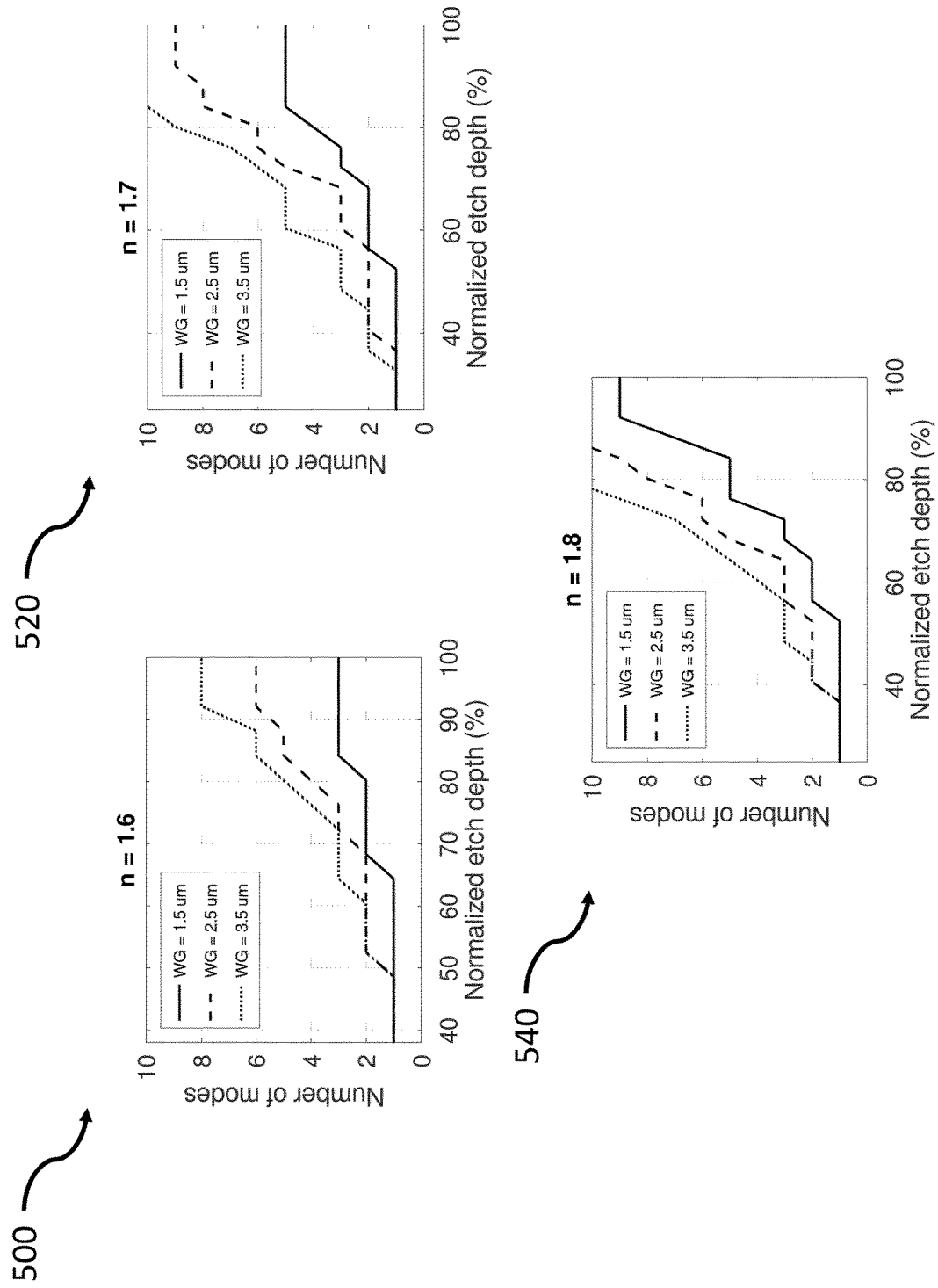
FIG. 5 shows illustrative simulation results for a device according to some embodiments of the present invention.

FIG. 5 presents some illustrative simulation results showing how the number of supported modes varies for the same geometrical and wavelength conditions as those considered in FIG. 4. The estimated number of modes is given by an approximate calculation in which we filter out TM modes and the very leaky (slab) modes. The key takeaway from all three views 500, 520 and 540 is that a relatively large number of guided TE modes is supported for the fully etched (100% etch depth) geometries characterizing intermediate waveguides used in prior art, e.g. U.S. Pat. No. 10,859,764 B2. For coupling between two waveguides, such as from the one in active layer 101 and the one in passive layer 102 as shown in FIG. 1, the potential multimoding in the intermediate region can result in higher losses, wavelength sensitivity and generally worse performance. This is especially true in practical cases where alignment between the layers and processing steps is not ideal, but inevitably has some non-zero offset. In typical DUV lithography systems such offsets are around 50 nm to 100 nm, while in older i-Line lithography systems they can be 200 nm or larger. This introduces variability in the coupling efficiency, and consequently worse performing PICs. Multimoding can also be an issue if the waveguide defined in layer 303 is bent, or has any other imperfection such as including particles, defects, etc.—all of which can excite higher order modes.

Multimoding is generally a result of deliberately matching the waveguide dimensions in the intermediate region to the mode size in the active region. The simulation results show that in the extreme case (typical of prior art as noted above) of a normalized etch depth of 100% (a maximally deep "step" where E=H) the number of modes supported by the intermediate waveguide is typically more than 1 and can easily exceed 10. However, if the normalized etch depth is reduced, forming a shallow step in the intermediate waveguide cross section, the number of supported modes can be significantly reduced. For the purposes of this disclosure, a shallow step should be understood to be defined by the condition E<0.85*H, meaning a normalized etch depth <85%. Calculations show that in most cases a shallow step allows us to approach quasi-single mode operation where only one TE mode is supported and can be guided with low loss, even along a bent or curved waveguide. The same effect applies if we are coupling TM modes, in which case the number of supported TM modes can be reduced by using a shallow step. This is not explicitly shown in the presented simulations but can easily be reproduced using electromagnetic simulation tools. Similarly, the threshold value of normalized etch depth required to ensure quasi-single mode operation, in terms of exactly how shallow the step must be, depends on other waveguide geometry parameters (thickness H and width WG) and refractive index contrast, but in each case can be readily simulated with electromagnetic simulation tools.

In brief, performing a shallow etch during fabrication of the intermediate waveguide to produce a shallow step in a cross-section view (see FIG. 3) improves the coupling performance between active and passive waveguides in the heterogeneous device by reducing the number of supported modes (see FIG. 5), and also enables routing in layer 303 to include bends and similar structures that could otherwise excite higher order modes and result in increased losses. This effectively enables the creation of more complex PICs, as part of passive functionality in the device can be provided in layer 303 as well as in layer 302.

Figure 6:
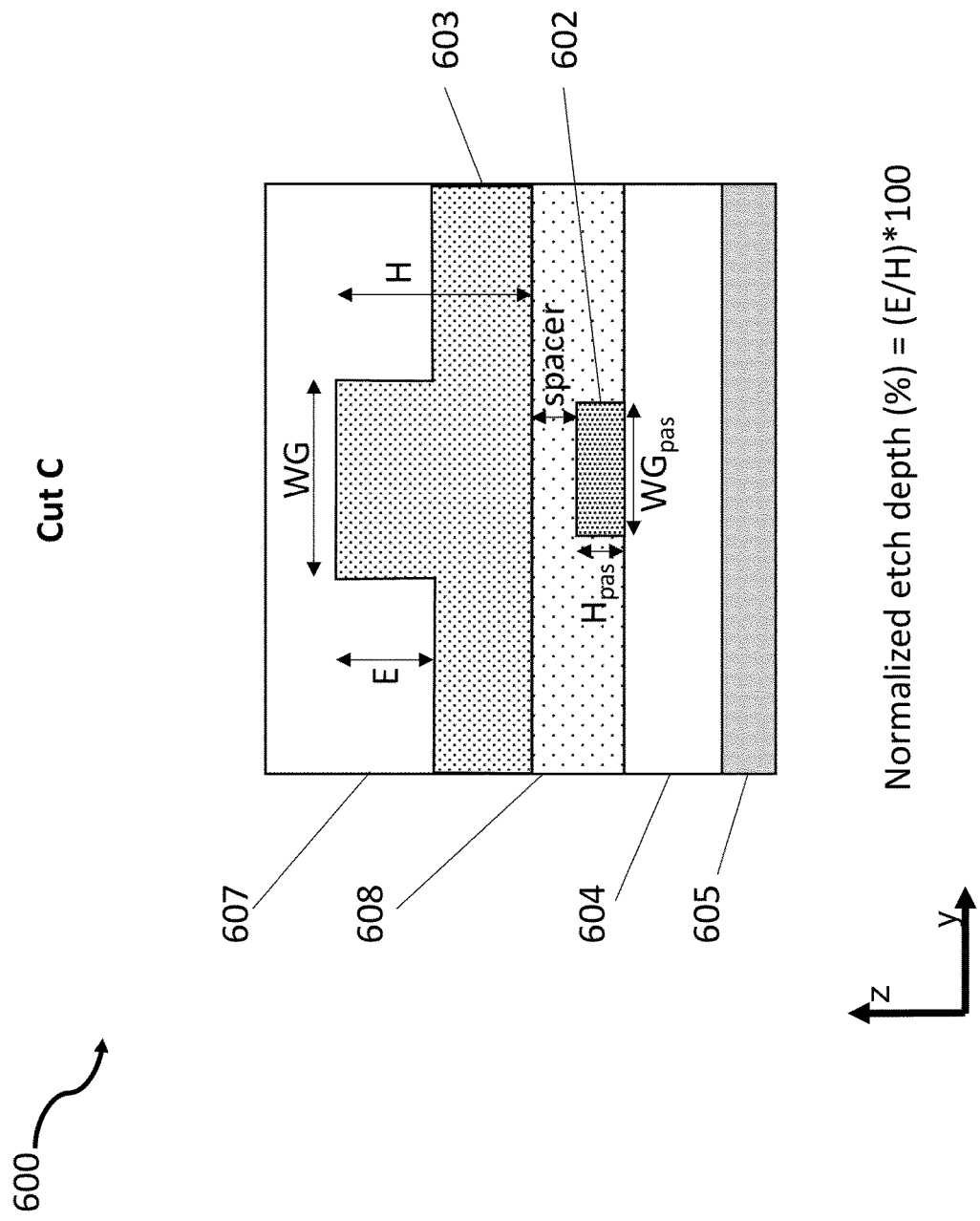
FIG. 6 shows cross-sectional end-on view of a device according to some embodiments of the present invention.

FIG. 6 and view 600 show a cross-sectional end-on view corresponding to the characteristic location marked C in FIG. 1. Functional layers 601 to 608 (unless explicitly defined differently) correspond to functional layers 101 to 108 as described in relation to FIG. 1. The cross-section 600 illustrates a cut through a region that comprises both the intermediate layer 603 (corresponding to 103 in FIG. 1) and passive layer 602 (corresponding to 102 in FIG. 1). Characteristic dimensions of layer 603, at least close to the butt-coupled interface to active device, are explained in relation to FIG. 3. The width WG can be varied along the length of the device (x-axis, explained in more detail with the help of FIG. 9) to optimize the performance. A passive waveguide core is defined in layer 602 with thickness $H_{pas}$ and width $WG_{pas}$. This core should not be confused with the waveguide core in the intermediate structure layer 603, which is also passive. The two passive layers (602 and 603) are separated, in the shown embodiment, by part of layer 608, acting as a spacer. In some embodiments, the thickness of the spacer is up to several hundreds of nm. In other embodiments, it can be as thick as several µm, or more. In yet other embodiments, as explained with the help of FIG. 10, there is no spacer.

In the embodiment shown in FIG. 6, layer 602 is defined with a single etch (i.e., it is fully etched. In other embodiments (not shown), layer 602 like layer 603 can also have shallow-etch waveguide features. In yet other embodiments, it can have two or more steps, formed using two or more etches. In some embodiments, the thickness of layer 602 is smaller than the thickness of layer 603 (both measured along the z-axis). In some embodiments it is between 10 nm and 400 nm. In yet other embodiments it is between 400 nm and 850 nm. The thickness is chosen such that the performance of the passive structure is optimized for a particular application. As an example, thickness may be kept relatively low if minimizing optical loss is more important, while it may be kept relatively high if dispersion engineering is more important. Similarly, thickness also determines the minimum acceptable bend radius and the compactness of the PIC, with thicker layers providing smaller bend radii. In the embodiments where layer 603 is thicker than layer 602, it is preferred that the refractive index of layer 603 is lower than the refractive index of layer 602 as that simplifies the phase matching as will be explained below with reference to FIG. 7.

Figure 7:
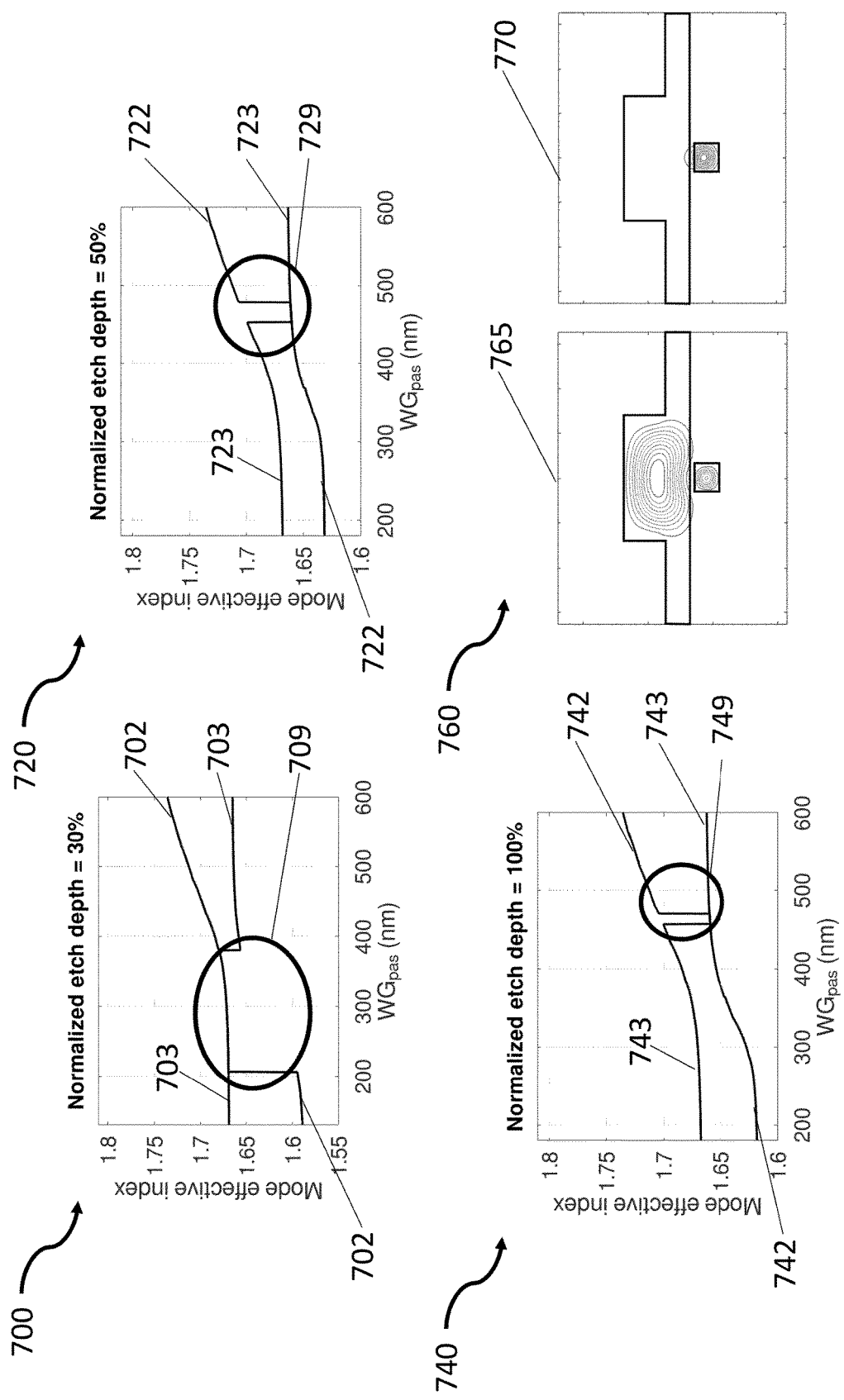
FIG. 7 shows illustrative simulation results for a device according to some embodiments of the present invention.

FIG. 7 shows some illustrative simulation results of how mode effective index matching may be achieved between coupled waveguides defined in layers 602 and 603 as the width ($WG_{pas}$) is varied (views 700, 720 and 740), as well as illustrative mode shapes for the two waveguide geometries (view 760). View 760 shows illustrative mode shapes for the situation (at a location corresponding roughly to cut C in FIGS. 1 and 6) when effective indexes of the two modes 765 (dominantly residing in layer 603) and 770 (dominantly residing in layer 602) are close to being matched. The contours correspond to regions of increasing electrical field (of the mode). In such cases when the mode effective indexes are matched or close to being matched, there is efficient power transfer between the two waveguides. Such matching is done by adjusting the geometries of the waveguides to account for the refractive index and thickness differences. We show examples of such matching by adjusting the width of the $WG_{pas}$ while keeping all other dimensions the same in views 700, 720 and 740. In all of the illustrated cases, the thickness H of layer 603 is 1 µm, width WG of layer 603 is 2.5 µm and the refractive index of layer 603 is 1.7. We show matching curves for the cases when etch depth is 30% (view 700), 50% (view 720) and 100% (view 740). At narrow $WG_{pas}$ widths, the effective index of the mode dominantly residing in layer 603 is higher, as shown with curves 703, 723 and 743 on the left side of the plots. The curve 703 corresponds to the intermediate waveguide (formed in 603) corresponding to 30% normalized etch depth, the curve 723 corresponds to 50% normalized etch depth, and the curve 743 correspond to 100% normalized etch depth. Similarly curves 702, 722, and 742 correspond to passive waveguide (formed in 602) at same normalized etch depths, respectively. As the width of $WG_{pas}$ is increased, the effective index of mode dominantly residing in layer 602 increases until there is a relatively wide region 709, 729 and 749 where we effectively have two modes coupled and supporting efficient power transfer between them. Finally, when the width of $WG_{pas}$ is increased yet further, the effective index of the mode dominantly residing in layer 602 becomes larger as shown with 701, 722 and 742, and mode coupling is suppressed. These simulations are for illustration and can be easily reproduced for any given geometry change using electromagnetic simulation tools. A similar condition of matching the effective indexes of modes can be achieved if the width of layer 603 is changed, and/or if the widths of both layers 602 and 603 are changed as will be explained with the help of FIG. 9.

Figure 8:
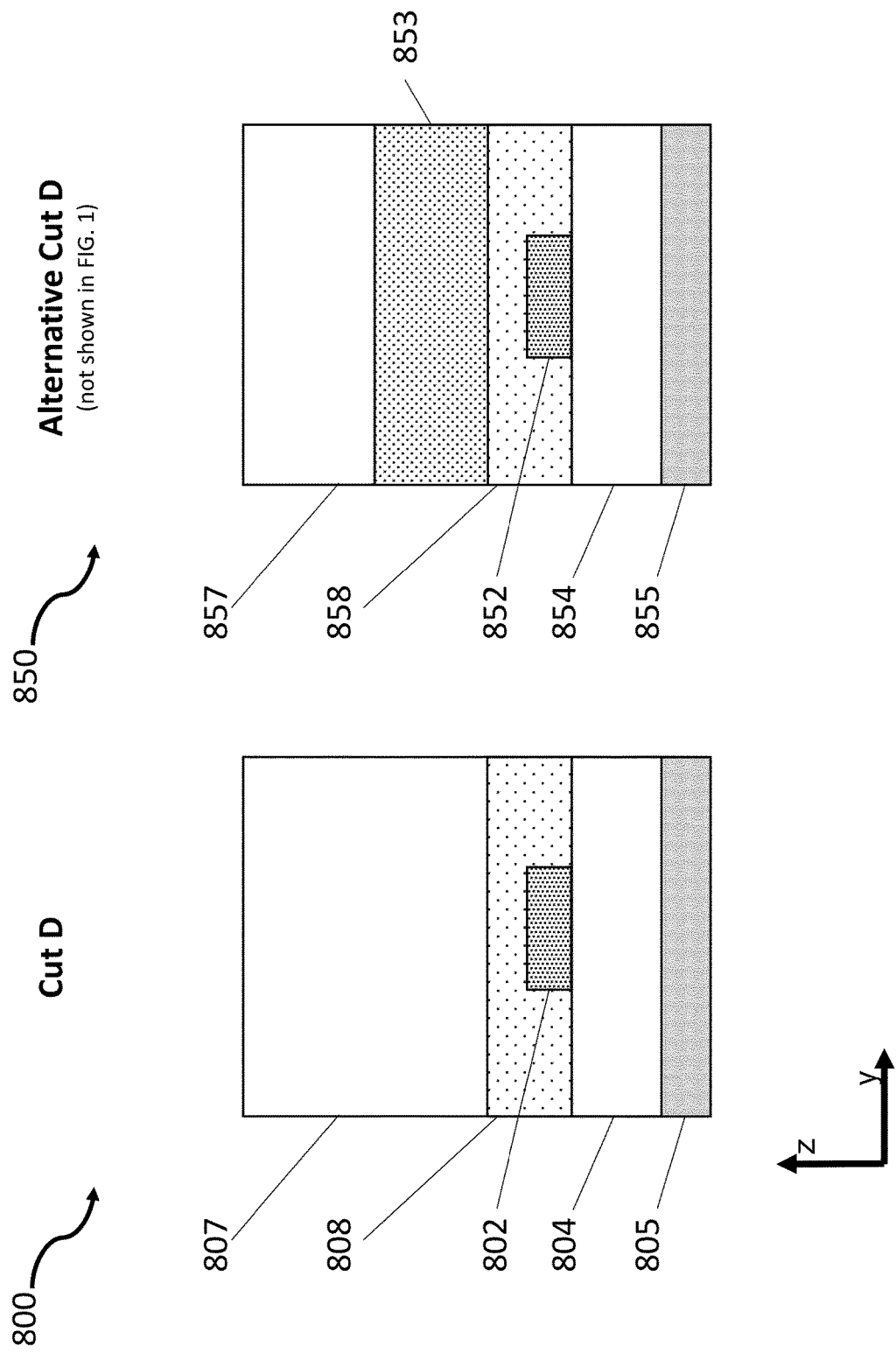
FIG. 8 shows two cross-sectional end-on views of devices according to some embodiments of the present invention.

FIG. 8 and view 800 show a cross-sectional end-on view corresponding to the characteristic location marked D in FIG. 1. Functional layers 801 to 808 (unless explicitly defined differently) correspond to functional layers 101 to 108 as described in relation to FIG. 1. The cross-section view 800 shows an illustrative cut through a region that comprises a waveguide in passive layer 802 (corresponding to 102 in FIG. 1) when the layer corresponding to 103 in FIG. 1 is fully removed. This can, for example, be achieved by using inverse tapers to first narrow down layer 103 before terminating it as will be shown in FIG. 9.

View 850 shows alternative cross-sectional end-on view that could correspond to same characteristic location marked D in FIG. 1, but not actually shown in FIG. 1. Functional layers 851 to 858 (unless explicitly defined differently) correspond to functional layers 101 to 108 as described in relation to FIG. 1. In this embodiment, layer 853 is not removed above layer 852 and, in some embodiments, serves as partial cladding to the mode for which layer 852 provides the core. This can, for example, be achieved by flaring out the layer 853 after the mode transition in area marked with C in FIG. 1 is achieved.

Figure 9:
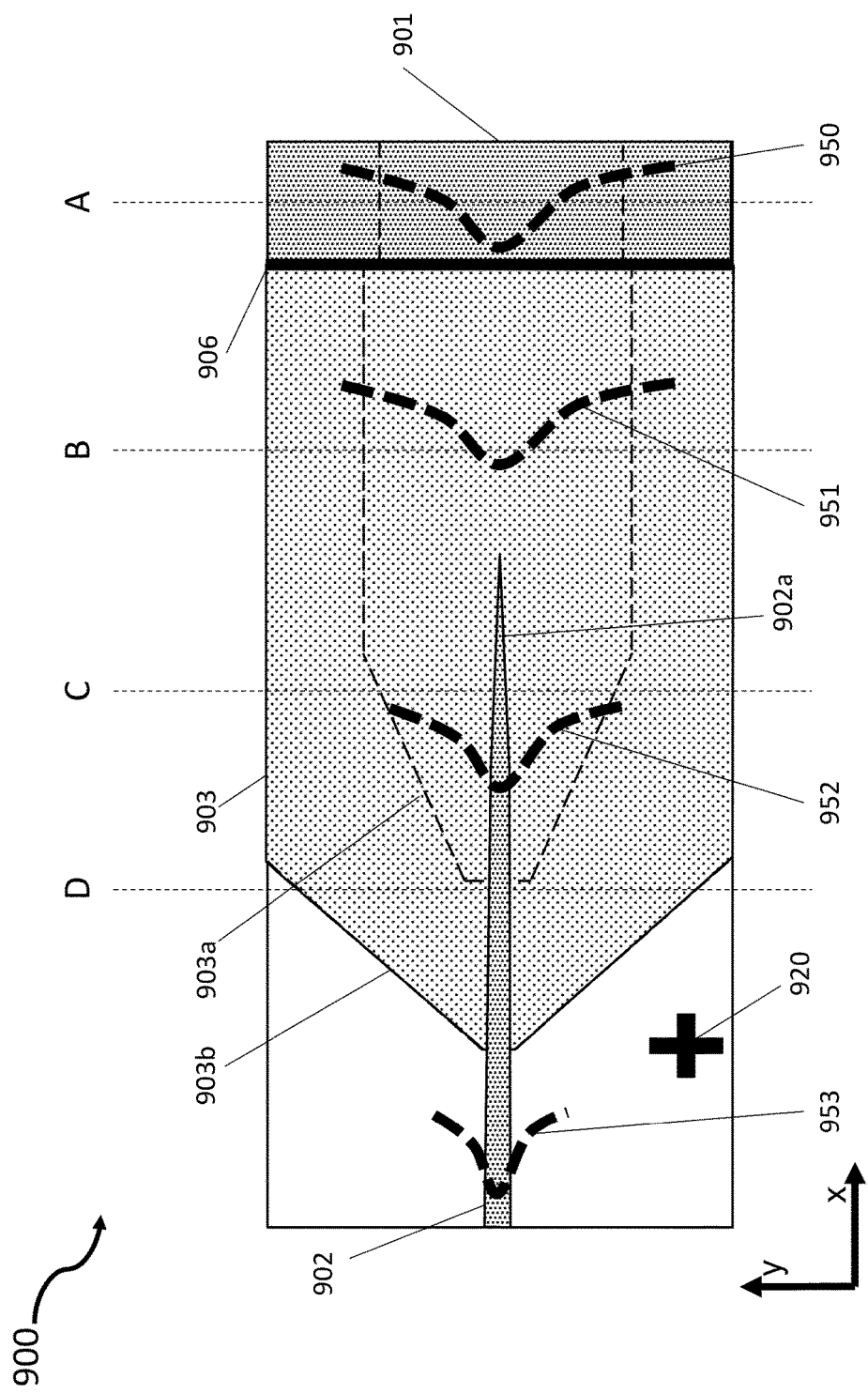
FIG. 9 shows a cross-sectional top-down view of a device according to some embodiments of the present invention.

FIG. 9 depicts a top-down view 900 of an integrated photonic device according to one embodiment of the present invention. Functional layers 901 to 906 (unless explicitly defined differently) correspond to functional layers 101 to 106 as described in relation to FIG. 1.

The dashed lines indicate boundaries of shallow steps (formed by shallow etches) in layer 901 and 903, while the full line indicates the boundary of a deep (full) etch in layer 902 and 903. The optical mode 950 supported by active layer 901 is guided through optional coating layer 906 to layer 903 that supports optical mode 951 and serves to convert the mode for efficient coupling to layer 902 which supports mode 953. Layer 906 can provide high reflection functionality or can facilitate reduced reflection when designed to function as an anti-reflection coating. The transition from mode 950 to 951 utilizes butt-coupling (no adiabatic transition), while the transition from mode 951 to 952 and finally 953 utilizes at least one taper in at least one of the layers 902 and 903. The requirements on taper tip dimensions, in transitions where tapers are utilized, are reduced due to the use of butt-coupling when transitioning between layers with large difference in refractive indices (layer 901 and 903). The embodiment shown in FIG. 9 corresponds to the embodiment described with the help of view 800 in FIG. 8. In this case, layer 903 is fully removed above layer 902 after the transition is complete. This is achieved by using two tapers, the shallow etched region is tapered using taper 903a, and deep etched (100% etch depth) taper 903b servers to fully remove layer 903 after transition to optical mode supported by layer 102 is complete. Layer 902, in this embodiment, is also tapered as shown with taper 902a and also described with the help of FIG. 7. In the case of embodiments corresponding to view 850 in FIG. 8, at least tapers 903b would be replaced with a flared-out region to effectively cover all of the waveguide 902 with at least partial 903 cladding (not shown).

In some embodiments (not shown), one or more of the interfaces between layers 901, 906 and/or 903 are angled to reduce corresponding back reflection(s) as is known in the art of butt-coupled interfaces. In other embodiments (and as also shown in FIG. 9), they are perpendicular to the direction of the propagation of the mode 950 to intentionally increase reflection, e.g. in the case of Fabry-Perot lasers or similar structures.

All etches are defined using common alignment marks 920, one of which is shown in FIG. 9. Various optimizations of the taper shapes and dimensions are possible to account for various material differences between layer and process related imperfections (such as alignment precision, sidewall angle, undercut, etc.).

Figure 10:
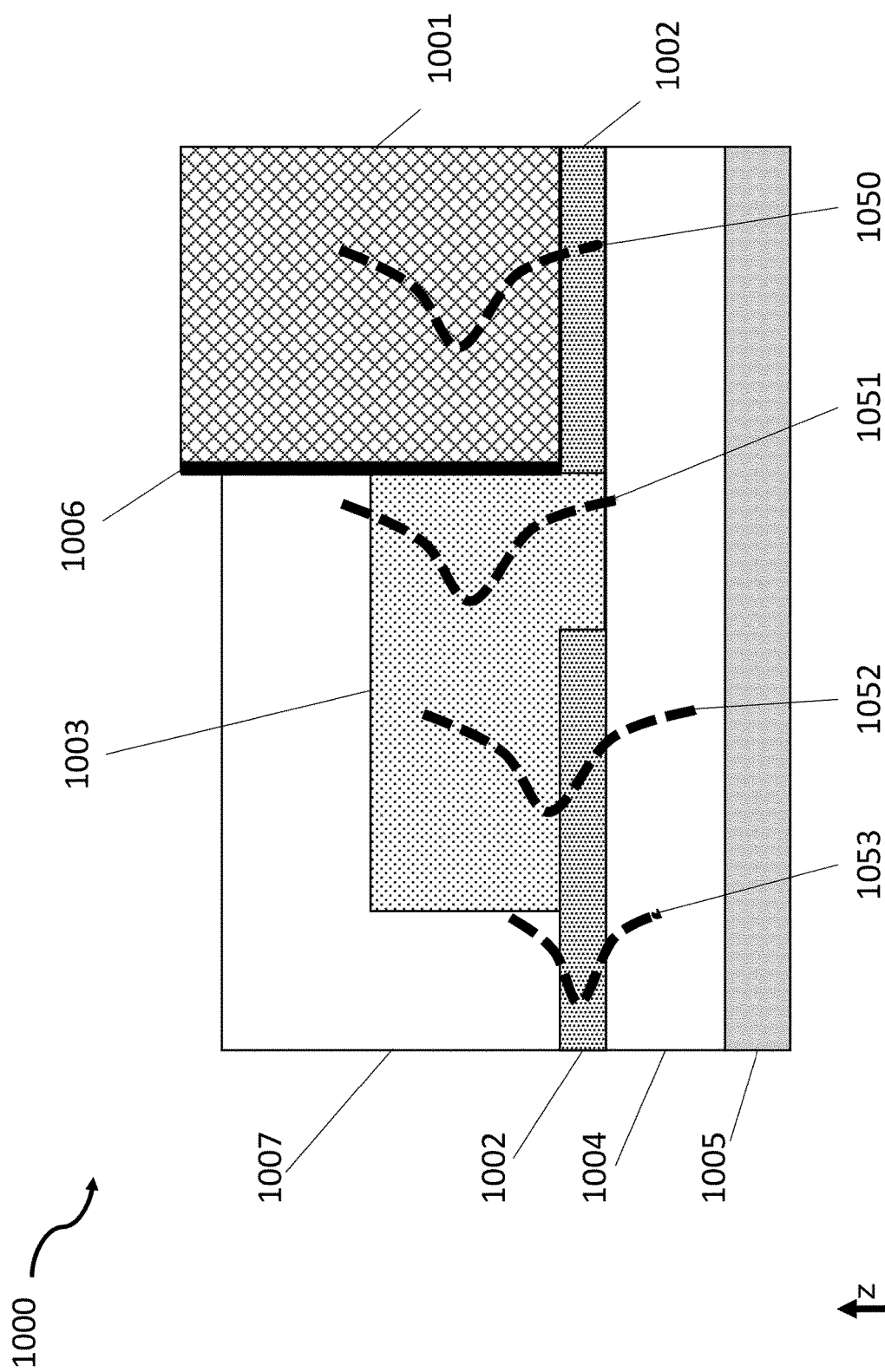
FIG. 10 shows a cross-sectional view of a device according to some embodiments of the present invention.

FIG. 10 is a schematic cross-section view of an embodiment of an integrated photonic device 1000 utilizing butt-coupling for efficient coupling between dissimilar materials. Functional layers 1001 to 1007 (unless explicitly defined differently) correspond to functional layers 101 to 107 as described in relation to FIG. 1. In contrast to the embodiment shown in FIG. 1, in this embodiment there is no planarization layer 108, so layer 1003 fills in the etched region of layer 1002 where mode 1051 is supported. This can enable simplified processing (without the need for a planarization step), but potentially provides worse performance as will be shown in FIG. 12. Coupling between modes 1050 and 1051 utilizes butt-coupling, while coupling between modes 1051, 1052 and 1053 utilizes a taper in at least one of the layers 1002 and 1003 (not visible in this cross-section).

Figure 11:
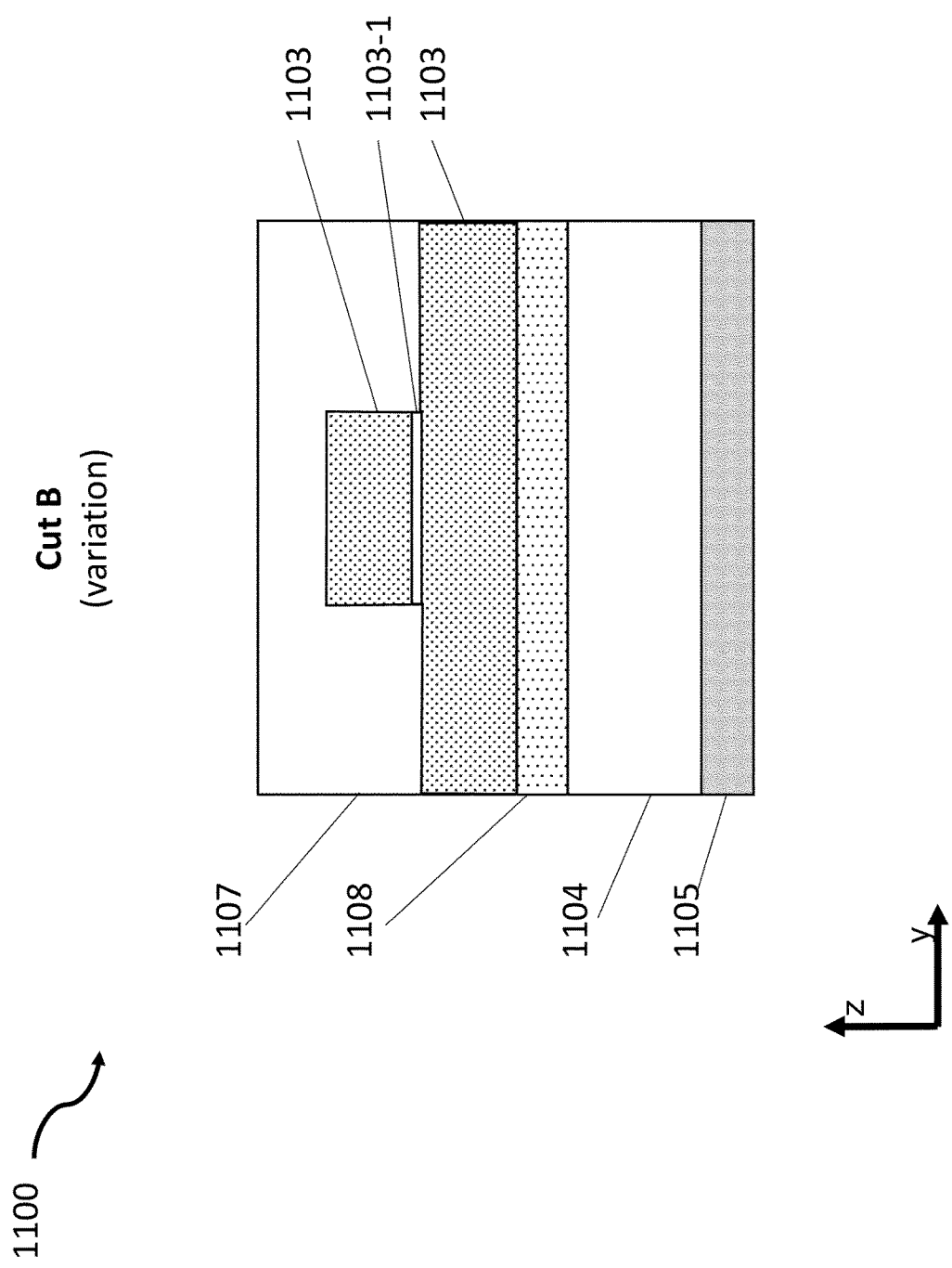
FIG. 11 shows cross-sectional end-on view of a device according to some embodiments of the present invention.

FIG. 11 shows an alternative cross-sectional end-on view 1100 that could correspond to the same characteristic location marked B in FIG. 1 but is not actually shown in FIG. 1. Functional layers 1101 to 1108 (unless explicitly defined differently) correspond to functional layers 101 to 108 as described in relation to FIG. 1. The difference between view 300 described with the help of FIG. 3 and view 1100 is in sublayer 1103-1 of layer 1103. The purpose of sublayer 1103-1 is to provide etch selectivity when performing the shallow etch of layer 1103. By using a selective etch sublayer, it is possible to further improve the uniformity (of the etch depth) across the wafer and consequently the uniformity of both the coupling and passive components realized in layer 1103. Various etch stop layers can be utilized, depending on the nature of layer 1103 and etches used to pattern layer 1103 (dry, wet, etc.). In an illustrative case, a thin layer of SiN can be utilized if layer 1103 is mostly made up of SiON. In other embodiments $Al_2O_3$ can be used as an etch stop layer. Many other material combinations are possible as will be known to someone skilled in the art.

Figure 12:
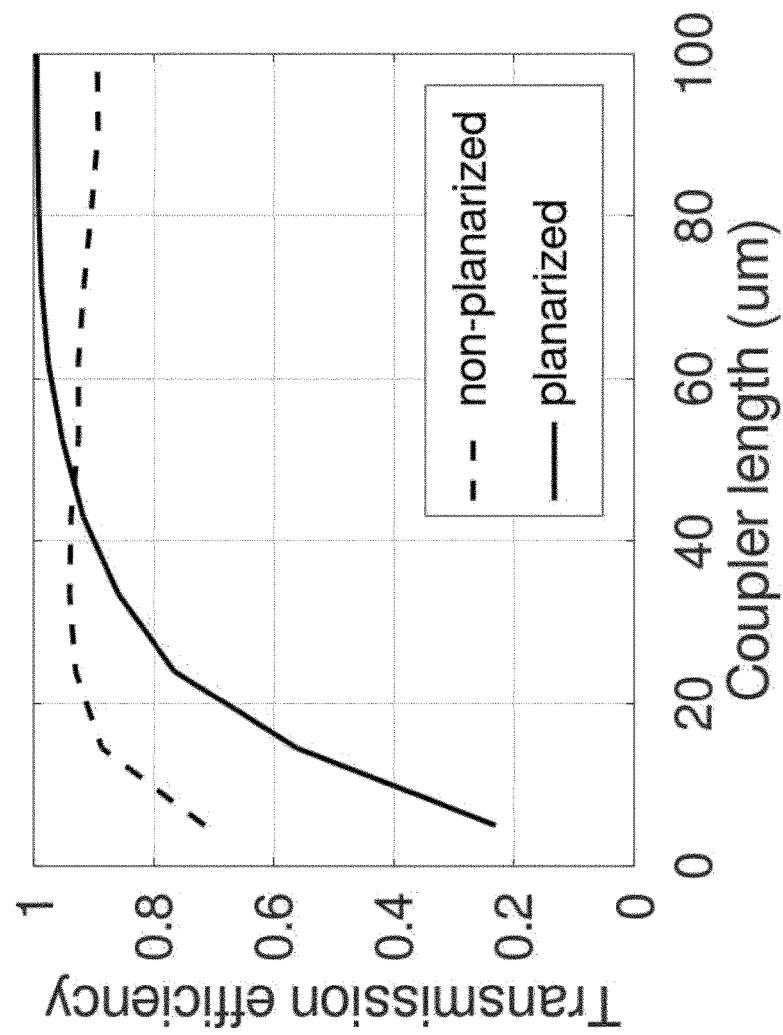
FIG. 12 shows illustrative simulation results for a device according to some embodiments of the present invention.

FIG. 12 shows illustrative simulation results for the coupling efficiency between modes 151 and 153 (planarized case), and the coupling efficiency between modes 1051 and 1053 (non-planarized case) as a function of taper (coupler) length. The non-planarized case can provide good performance with relatively short tapers achieving >90% coupling efficiency, but the planarized case can achieve close to 100% coupling efficiency with proper design at longer lengths. This is due to efficient adiabatic coupling that reduces the scattering loss, and also enables better mode matching. Both approaches can be beneficial in specific applications. In both cases, the use of a shallow etched waveguide in the intermediate waveguide structure greatly improves the uniformity of coupling due to providing high degree of modal control (suppressing multimoding behavior) as described above and more specifically with the help of FIGS. 3-5.

It is to be understood that these illustrative embodiments teach just some examples of heterogeneously integrated lasers and active components utilizing the present invention, and many other, similar arrangements can be envisioned. Furthermore, such lasers and active components can be combined with multiple other components to provide additional functionality or better performance such as various filtering elements, amplifiers, monitor photodiodes, modulators and/or other photonic components.

Embodiments of the present invention offer many benefits. The integration platform enables scalable manufacturing of PICs made from multiple materials providing higher-performance and/or ability to operate in broadband wavelength range. Furthermore, the platform is capable of handling high optical power compared to typical Si waveguide-based or InP waveguide-based PICs.

This present invention utilizes a process flow consisting typically of wafer-bonding of a piece of compound semiconductor material on a carrier wafer with dielectric waveguides (as is described with the help of FIG. 1) and subsequent semiconductor fabrication processes as is known in the art. It enables an accurate definition of optical alignment between active and passive waveguides typically via a lithography step, removing the need for precise physical alignment. Said lithography-based alignment allows for scalable manufacturing using wafer scale techniques.

It is to be understood that optical coupling between modes in active and passive layers is reciprocal, so that, taking FIG. 1 as example, the structure can be configured to facilitate light transmission from region 101 to region 102, but it could also facilitate transmission in the reverse direction, from region 102 to region 101. It is to be understood that multiple such transitions with no limitation in their number or orientation can be realized on a suitably configured PIC.

Other approaches have relied on die attachment of pre-fabricated optical active devices to passive waveguides. This requires very stringent alignment accuracy which is typically beyond what a typical die-bonder can provide. This aspect limits the throughput of this process as well as the performance of optical coupling.

Embodiments of the optical devices described herein may be incorporated into various other devices and systems including, but not limited to, various computing and/or consumer electronic devices/appliances, communication systems, medical devices, sensors, and sensing systems.

It is to be understood that the disclosure teaches just few examples of the illustrative embodiment and that many variations of the invention can easily be devised by those skilled in the art after reading this disclosure and that the scope of the present invention is to be determined by the following claims.

The invention claimed is:

1. A device comprising:
   first, second and third elements fabricated on a common substrate;
   wherein the first element comprises an active waveguide structure characterized by a mesa, supporting a first optical mode, the second element comprises a passive waveguide structure supporting a second optical mode, and the third element, at least partly butt-coupled to the first element, comprises an intermediate waveguide structure characterized by an intermediate waveguide core cross section including a shallow step, the intermediate waveguide structure supporting at least one intermediate optical mode;
   wherein a tapered waveguide structure in at least one of the second and third elements facilitates efficient adiabatic transformation between the second optical mode and one of the intermediate optical modes;
   wherein no adiabatic transformation occurs between any of the intermediate optical mode and the first optical mode; and
   wherein mutual alignments of the first, second and third elements are defined using lithographic alignment marks that facilitate precise alignment between layers formed during processing steps of fabricating the first, second and third elements.

2. The device of claim 1,
   wherein the third element is deposited onto a planarized top surface overlying the substrate.
3. The device of claim 2,
   wherein the second and third elements are separated by a spacer with a spacer thickness >10 nm.
4. The device of claim 1,
   wherein the mesa in the first element active waveguide structure has a mesa width between 1 μm and 5 μm.
5. The device of claim 4,
   wherein the first element active waveguide structure is defined by an active width that is at least 2 μm wider than the mesa width.
6. The device of claim 1,
   wherein the mesa in the first element active waveguide structure has a mesa width greater than 5 μm.
7. The device of claim 1,
   wherein the third element has a waveguide core thickness greater than 600 nm and a refractive index between 1.6 and 1.9.
8. The device of claim 1,
   wherein the third element has a waveguide core width larger than a mesa width characterizing the mesa in the first element active waveguide structure.
9. The device of claim 1,
   wherein a normalized etch depth percentage characterizing the shallow step in the intermediate waveguide structure is equal to or smaller than 85%.
10. The device of claim 1,
    wherein a normalized etch depth percentage characterizing the shallow step in the intermediate waveguide structure is equal to or smaller than 50%.
11. The device of claim 1,
    wherein an interface between the first and third elements is angled at a value optimized to minimize reflections, the value being greater than 5 degrees with respect to an axial direction of travel for light travelling through the active structure.
12. The device of claim 1,
    wherein the third element serves as cladding in at least part of the device for the second element waveguide structure.
13. The device of claim 1,
    wherein the first element comprises at least one of In, P, Ga, As and the second element comprises at least one of Si, N, O, Li.
14. The device of claim 1,
    wherein the third element comprises an etch stop layer.
15. The device of claim 1,
    wherein the third element waveguide is bent or curved with respect to an axial direction of travel for light travelling through the active structure.
16. The device of claim 1,
    wherein the first element optical mode has a cross sectional area greater than or equal to 1 μm$^2$.
17. The device of claim 1,
    wherein the passive waveguide structure in the second element is characterized by a passive waveguide width selected at least in part to optimize coupling between the intermediate optical mode and the second optical mode.

* * * * *